United States Patent
Ohshita

(10) Patent No.: US 6,870,639 B2
(45) Date of Patent: Mar. 22, 2005

(54) METHOD AND APPARATUS FOR IMAGE DATA PROCESSING SYSTEM INCREASING QUALITY OF PRODUCED IMAGES

(75) Inventor: Masakazu Ohshita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 838 days.

(21) Appl. No.: 09/789,515

(22) Filed: Feb. 22, 2001

(65) Prior Publication Data

US 2001/0021030 A1 Sep. 13, 2001

(30) Foreign Application Priority Data

Feb. 22, 2000 (JP) .................................... 2000-044388

(51) Int. Cl.⁷ .............................................. H04N 1/409
(52) U.S. Cl. ....................... 358/1.9; 358/3.06; 358/3.27; 382/266; 382/269
(58) Field of Search ................................. 382/195, 199, 382/256, 266, 267, 269; 358/1.9, 3.26, 3.27, 534

(56) References Cited

U.S. PATENT DOCUMENTS

| 5,596,684 | A | * | 1/1997 | Ogletree et al. ............. 358/1.9 |
| 5,638,463 | A | * | 6/1997 | Ohshita ....................... 382/195 |
| 5,649,034 | A | * | 7/1997 | Sonobe ........................ 382/298 |
| 5,666,213 | A | * | 9/1997 | Ohshita et al. ............. 358/448 |
| 6,072,593 | A |   | 6/2000 | Ooshita |
| 6,181,835 | B1 | * | 1/2001 | Hamill ....................... 382/299 |
| 6,195,473 | B1 | * | 2/2001 | Zable et al. ................. 382/299 |
| 6,289,136 | B1 | * | 9/2001 | Oshino et al. .............. 382/298 |

FOREIGN PATENT DOCUMENTS

| JP | 5-207282 | 8/1993 |
| JP | 7-87321  | 3/1995 |

* cited by examiner

*Primary Examiner*—Thomas D. Lee
(74) *Attorney, Agent, or Firm*—Oblon, Spivak, McClelland, Maier & Neustadt, P.C.

(57) ABSTRACT

An image data processing apparatus and method in which a FIFO memory replicates identical image data in a bit-map formation based on a timing signal, and a pattern recognizing section recognizes characteristics of a line shape of a boundary between a black-dot region and a white-dot region of the image data. In addition, a determining device determines whether or not a relevant dot is one to be corrected is determined, and a dot correction section performs correction on the dot. Also included is a replication number setting unit which sets any number of times the FIFO memory repeatedly outputs the replicated image data to a window by replicating the identical image data.

9 Claims, 16 Drawing Sheets

METHOD AND APPARATUS FOR IMAGE DATA PROCESSING SYSTEM INCREASING QUALITY OF PRODUCED IMAGES

This document claims priority and contains subject matter related to Japanese Patent Application No. 2000-044388, filed on Feb. 22, 2000, the entire contents of which are incorporated by reference.

BACKGROUND OF THE INVENTION

1. Field of the Invention

The present invention relates to a method and an apparatus for processing digital image data to be used in an image forming apparatus, such as an optical printer (e.g., a laser printer), a digital copying machine, and a plain-paper facsimile, etc., and more particularly to a method and an apparatus that can improve a quality of resultant images produced by such an apparatus.

2. Discussion of the Background

Japanese Patent Laid-Open Publication No. 5-207282 discloses a method for correcting jags on an outline of bit-mapped image data so as to improve the quality of resultant images. By using such a method, the amount of data stored in a memory to perform the above-mentioned correction on the bit-mapped image can be reduced. Further, in this method, it is rapidly determined which dots in the image data are to be corrected, and which type of correction is required. The determination is also made in an extremely short time by simple logical operations using a microprocessor.

According to the above-mentioned method, characteristics of a line shape of a boundary between a black-dot region and a white-dot region of image data in a bit-map formation are recognized. The recognized characteristics for each dot of the image data are then converted into multi-bit code information. Then, at least a part of the code information is used to determine whether or not the relevant dot is one to be corrected. When the dot is determined as requiring correction, the correction is performed on the dot based on the above-described code information.

An image data processing apparatus, which performs the above-described image data processing method, includes a window and a pattern recognizing means. The window extracts data of dots in a predetermined region of the bit-mapped image data, and the region includes a relevant dot in the center thereof. The pattern recognizing means recognizes the line shape of the boundary between the black-dot region and the white-dot region of the image data extracted by the window so as to generate the multi-bit code information showing the recognized line shapes of the dots. The apparatus also includes a determining means and a correction data memory. The determining means determines whether or not dots are to be corrected using at least a part of the code information. The correction data memory reads and outputs previously stored correction data for the dots to be corrected using the code information generated by the pattern recognizing means as a corresponding address.

Further, in the above-described method, it is not necessary to provide and store as templates all characteristic patterns which are corrected. The determination as to which dots are to be corrected and which correction data is required for the dots can simply be made in a short time.

In another method disclosed in Japanese Patent Laid-Open Publication No. 7-87321, a magnification of image data and a density conversion of the image data to increase a resolution are performed at the same time when a jag-correction is performed. This is accomplished by adding the information of the image data in both a main scanning and a sub-scanning directions to the above-mentioned code information.

However, the above background art method does not have a function to reduce image data. According to a method in which a reduction of image data is described, the reduction of the image data is performed by controlling whether or not the image data previously stored in a page memory is read out. In this method, the reduction of the image data is performed by a simple deletion of an original image data or by discontinuously performing a plurality of readouts of the original image data. In the method in which the simple deletion of the original image is made, degradation in the quality of a resultant image might occur. In the method in which a plurality of readouts of the original image is discontinuously performed, although the degradation in the image quality may hardly occur, little effect of the jag-correction is obtained.

In addition, when a reduction or an enlargement of image data in size is performed, complicated calculations are required for adjusting a position of the resultant reduced or enlarged image in a printing sheet.

SUMMARY OF THE INVENTION

Accordingly, one object of the present invention is to solve the above-mentioned and other problems.

Another object of the present invention is to provide a novel image data processing apparatus, and method in which jags on an outline of bit-mapped image data are corrected so as to improve a resulting image quality.

To achieve these and other objects, the present invention provides an image data processing apparatus and method including an image data replicating device configured to repeatedly replicate identical image data bit-mapped in a identical timing based on a periodically generated signal and a pattern recognizing device configured to recognize characteristics of a line shape of a boundary between a black-dot region and a white-dot region of the image data in a bit-map formation replicated by said replicating device. The pattern recognizing device converts the recognized characteristics of the line shape of each dot into bit code information. Also included is a determining device configured to determine whether or not a dot is to be corrected by using at least a part of the code information, and a dot correction device configured to perform the correction, based on the code information, on the dot determined that the correction is required. A setting of the number of times of replication of the bit-mapped identical image data replicated by the image data replicating device is switched to a case where the replication number of times is set to one fixed value and a case where the replication number of times is set such that two or more value is periodically selected. The replication of the identical image data is set to be performed during the time period when image data to be printed in an effective image region in a printing sheet is processed.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
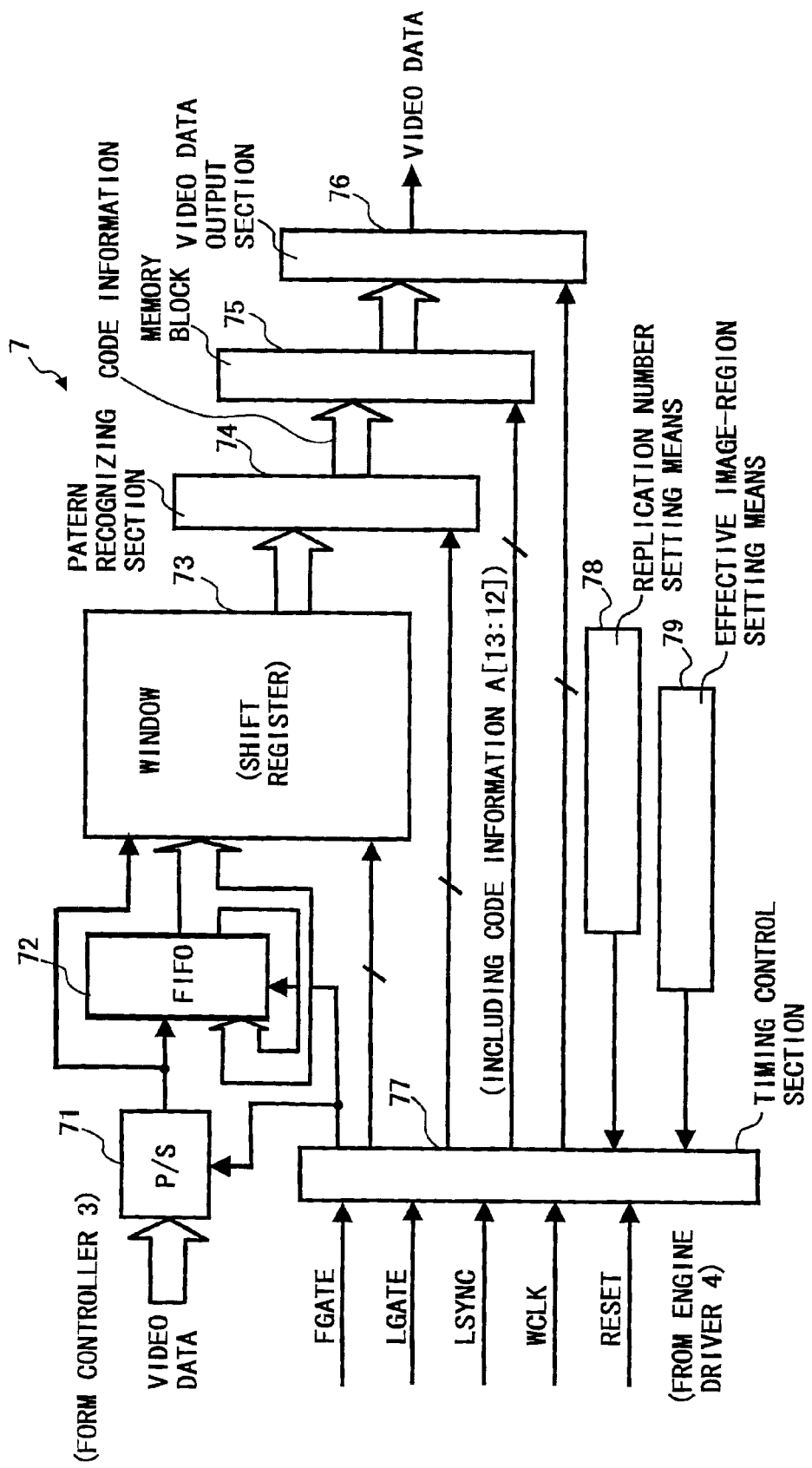
FIG. 1 is a block diagram illustrating an exemplary construction of a dot correction section in a laser printer as an image forming apparatus according to the present invention.

Referring now to the drawings, wherein like reference numerals designate identical or corresponding parts throughout the several views, the present invention will be described in more detail.

Figure 7:
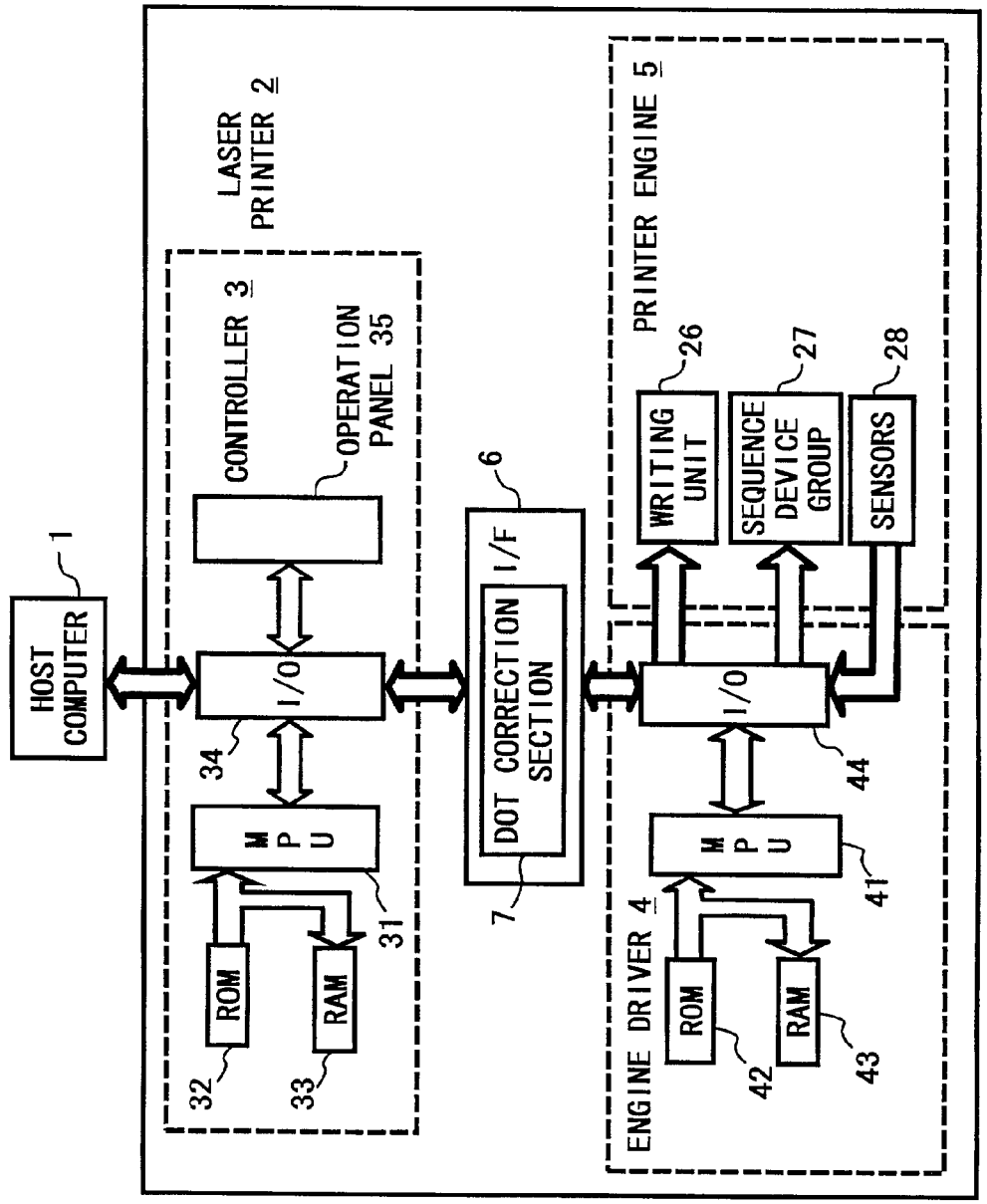
FIG. 7 is a block diagram illustrating an exemplary construction of a laser printer as an image forming apparatus according to the present invention.

First, turning to FIG. 7, which is a block diagram illustrating an exemplary construction of a laser printer as an image forming apparatus according to the present invention.

As shown, a laser printer 2 includes a controller 3, an engine driver 4, a printer engine 5, and an internal interface 6. The laser printer 2 receives printing data from a host computer 1, and the printing data is converted into bit-map data for each page by the controller 3. The controller 3 then converts the bit-map data into video data which is dot information to drive a laser. The video data is transmitted to the engine driver 4 through the internal interface 6 so as to sequentially control the printer engine 5 such that a visible image is formed on a printing sheet.

The internal interface 6 includes a dot correction section 7. The dot correction section 7 performs a dot correction, according to the image data processing method of the present invention, on the video data transmitted from the controller 3 so as to improve image quality.

The controller 3 includes a main microcomputer 31 (hereinafter referred to as a MPU), a ROM 32 which stores a program, constant data, text font, and so forth used by the MPU 31, and a RAM 33 which stores temporary data and dot-pattern data, etc. The controller 3 further includes an I/O 34 which controls data input and output, and an operation panel 35 which is connected to the MPU 31 via the I/O 34. The above-described components are connected with each other via a data bus, an address bus, a control bus, and so forth. The host computer 1 and the internal interface 6 including the dot correction section 7 are connected to the MPU 31 via the I/O 34.

The engine driver 4 includes a sub-microcomputer 41 (hereinafter referred to as a MPU), a ROM 42 which stores a program, constant data, and so forth used by the MPU 41, a RAM 43 which stores temporary data, and an I/O 44 which controls data input/output. The above-described components are connected with each other via a data bus, an address bus, a control bus, and so forth.

The I/O 44 connected to the internal interface 6 inputs the video data from the controller 3, and also inputs states of various types of switches provided on the operation panel 35. The I/O 44 outputs an image clock signal (WCLK), and status signals (such as a paper end signal, etc.) to the controller 3. The I/O 44 is also connected to a writing unit 26, a sequence device group 27, and various types of sensors 28 including a synchronous sensor which will be described below. These components are included in the printer engine 5.

The controller 3 receives commands, such as printing instructions, and printing data (e.g., text data, image data, etc.) from the host computer 1. The controller 3 edits the received printing data, and then converts the data into corresponding dot pattern data (which is used for writing an image) by a text font stored in the ROM 32 when the printing data includes a text code. The controller 3 forms the corresponding bit-map data of the texts and the images (hereinafter collectively referred to as images), and then stores the bit-map data into a video-RAM area in the RAM 33 per unit of page.

When the controller 3 receives a ready signal and an image clock signal WCLK supplied by the engine driver 4, the controller 3 outputs the bit-map data (i.e., dot pattern data) stored in the video-RAM area in the RAM 33 as video data synchronizing with the image clock signal WCLK to the engine driver 4 via the internal interface 6. The dot correction section 7 in the internal interface 6 performs a dot correction operation on the video data, which will be described below.

The operation panel 35 includes various switches and indicators (not shown). According to an operator's instructions, the operation panel 35 transfers the specified data and information to the engine driver 4, and displays states of the laser printer 2 via the indicators.

The engine driver 4 uses the video data (on which a dot correction operation has been performed) supplied by the controller 3 via the internal interface 6 to control the writing unit 26 of the printer engine 5, and the sequence device group 27 (such as a charger, a developing unit, and so forth). The engine driver 4 inputs video data used for writing an image via the internal interface 6, and outputs the video data to the writing unit 26. The engine driver 4 further inputs signals, which indicate states of each part in the engine, from a synchronous sensor, and the various types of sensors 28. The engine driver 4 suitably processes the input signals. The engine driver 4 also outputs status signals including an error-state signal (e.g., a paper end signal) to the controller 3 via the internal interface 6.

Figure 8:
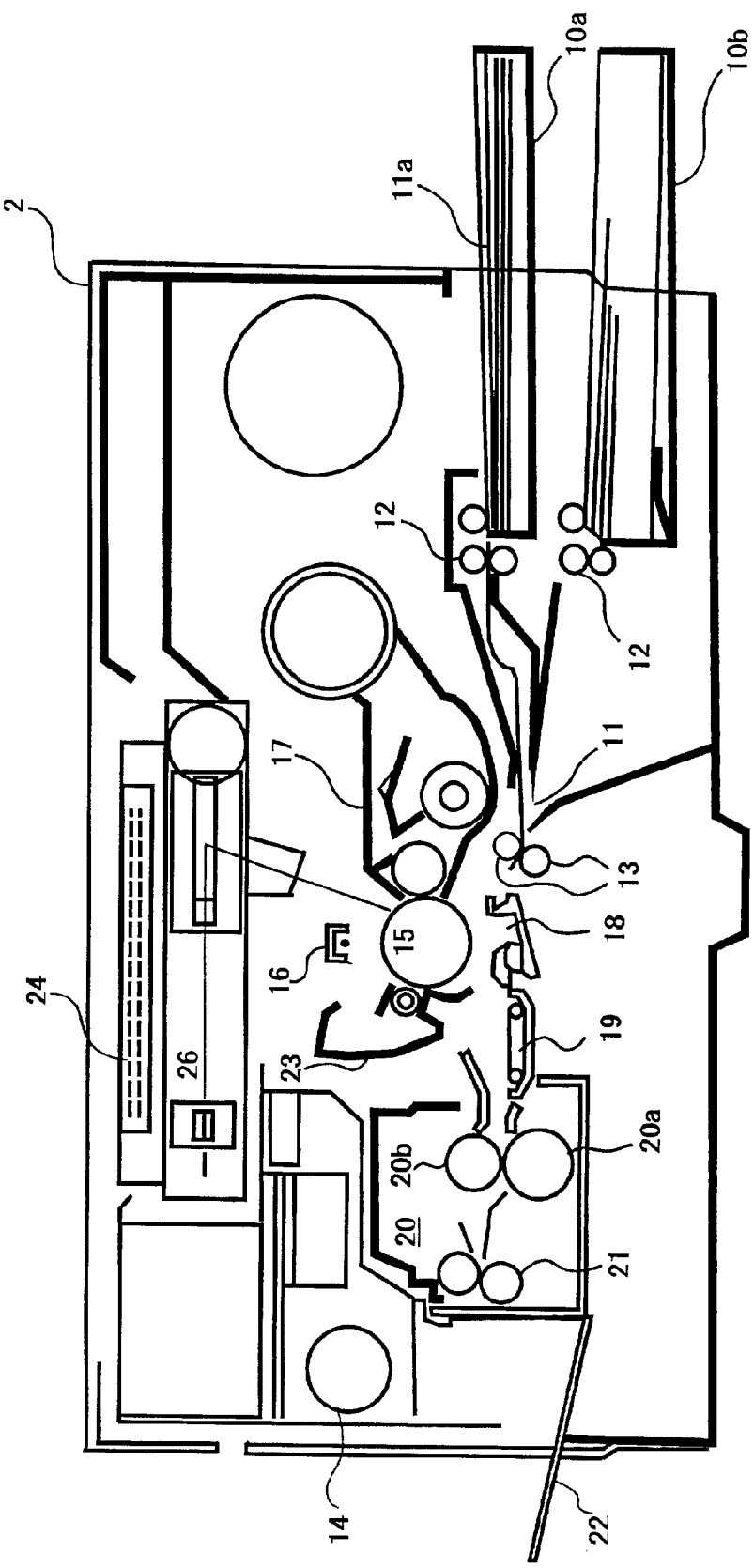
FIG. 8 is a schematic drawing illustrating an exemplary construction of a printer engine of the laser printer illustrated in FIG. 7.

FIG. 8 is a schematic drawing illustrating an exemplary construction of the printer engine 5 of the laser printer 2. The laser printer 2 includes two sheet feeding cassettes 10a and 10b which are vertically arranged. For example, a transfer sheet 11 supplied from a sheet stack 11a of the upper sheet feeding cassette 10a is conveyed by a sheet feeding roller 12. The transfer sheet 11 is conveyed to an image transfer position of a photoconductive drum 15 after a pair of registration rollers 13 adjusted a time to convey the transfer sheet 11.

A surface of the photoconductive drum 15, rotatively driven by a main motor 14, is charged by the charger 16, and an electrostatic latent image is formed on the surface of the photoconductive drum 15 by scanning its surface with PW-modulated laser beam light supplied from the writing unit 26.

Further, the electrostatic latent image is developed into a visible image with toner by a developing unit 17. The visible toner image is transferred onto the transfer sheet 11 (which is conveyed by a pair of registration rollers 13) by a transfer charger 18. The transfer sheet 11 carrying the transferred toner image is separated from the photoconductive drum 15, and is conveyed to a fixing unit 20 by a sheet feeding belt 19. A pressing roller 20a presses the transfer sheet 11 onto a fixing roller 20b so as to fix the toner image onto the transfer sheet 11 by the pressure and the temperature of the fixing roller 20b.

The transfer sheet 11 conveyed from the fixing unit 20 is discharged to a sheet exit tray 22 provided at a side of the laser printer 2 by a sheet discharging roller 21. Residual toner remaining on the photoconductive drum 15 is removed by a cleaning unit 23, and is collected. The laser printer 2 includes a plurality of printed circuit boards 24 at the upper part thereof, which include the controller 3, the engine driver 4, and the internal interface 6.

Figure 9:
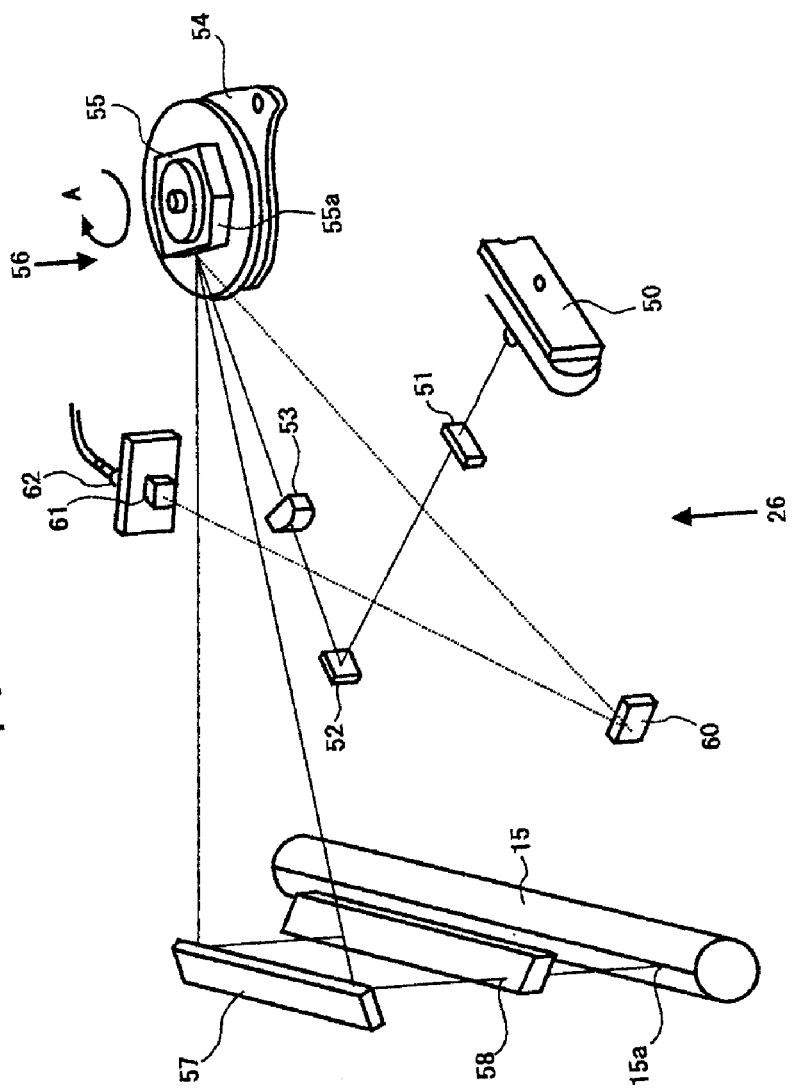
FIG. 9 is a perspective view illustrating an exemplary construction of the writing unit in FIG. 7.

FIG. 9 is a perspective view illustrating an exemplary construction of the writing unit 26 in FIG. 7. The writing unit 26 includes a LD unit 50 (laser diode unit), a first cylindrical lens 51, a first mirror 52, an image formation lens 53, a disc-shaped motor 54, a rotational polarizer 56 including a polygon mirror 55 which rotates in a direction indicated by the arrow A, a second mirror 57, a second cylindrical lens 58, a third mirror 60, a light converging lens 61 including a cylindrical lens, and a synchronous sensor 62 including a photosensitive element.

The LD unit 50 includes a laser diode (hereinafter referred to as a LD), and a collimator lens integrated inside the LD unit 50. The collimator lens changes a divergent beam emitted by the LD into a parallel beam.

The first cylindrical lens 51 shapes the parallel beam emitted from the LD unit 50 in a sub-scanning direction on the surface of the photoconductive drum 15. The image formation lens 53 converts a parallel beam reflected by the first mirror 52 into a convergence beam, and leads the beam to one of the mirror surfaces 55a of the polygon mirror 55.

Each mirror surface 55a of the polygon mirror 55 has a curved shape such that the polygon mirror 55 is an R polygon mirror, which eliminates f lens conventionally located between the polygon mirror 55 and the second mirror 57. The rotational polarizer 56 is one of a post object type in which beam light is led to a polarizer after being converted into converging beam light.

The second mirror 57 reflects beam light (i.e., scanning beam light), which has been refected and polarized by the rotational polarizer 56, to the photoconductive drum 15. The scanning beam light reflected by the second mirror 57 converges to form a focused spot on a surface of the photoconductive drum 15 on a main scanning line 15a.

The third mirror 60 is disposed at a position outside a scanning area on the photoconductive drum 15 where the beam light reflected by the rotational polarizer 56 scans. Further, the third mirror 60 reflects the incident beam light to the synchronous sensor 62. The synchronous sensor 62 receives the beam light reflected by the third mirror 60, which is converged by the light converging lens 61. The synchronous sensor 62 including a photosensitive element (such as a photodiode) converts the received beam light into a sychronous signal to fixedly maintain a scanning start position.

Figure 10:
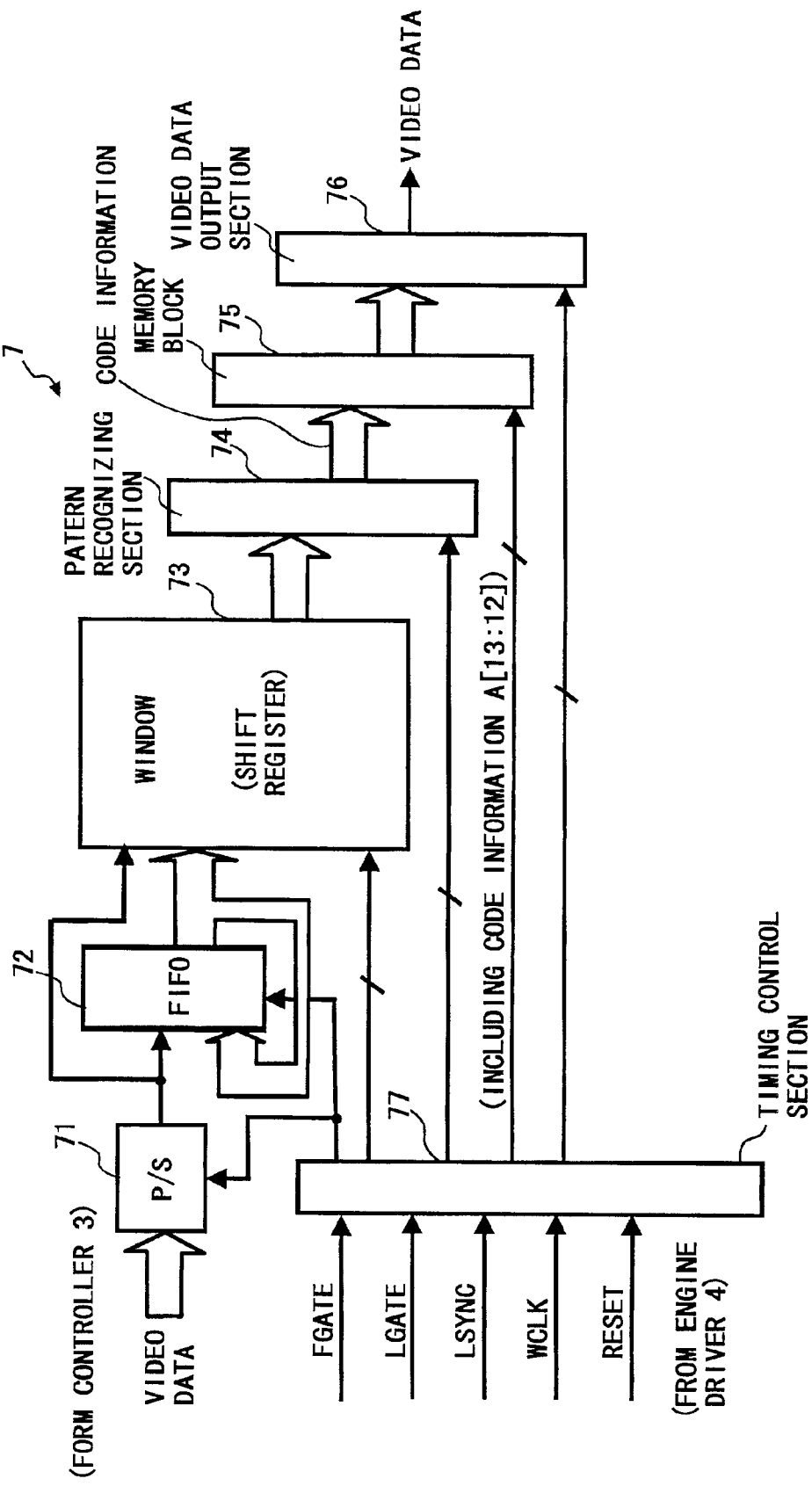
FIG. 10 is a block diagram illustrating an exemplary construction of the dot correction section in FIG. 7.
Figure 11:
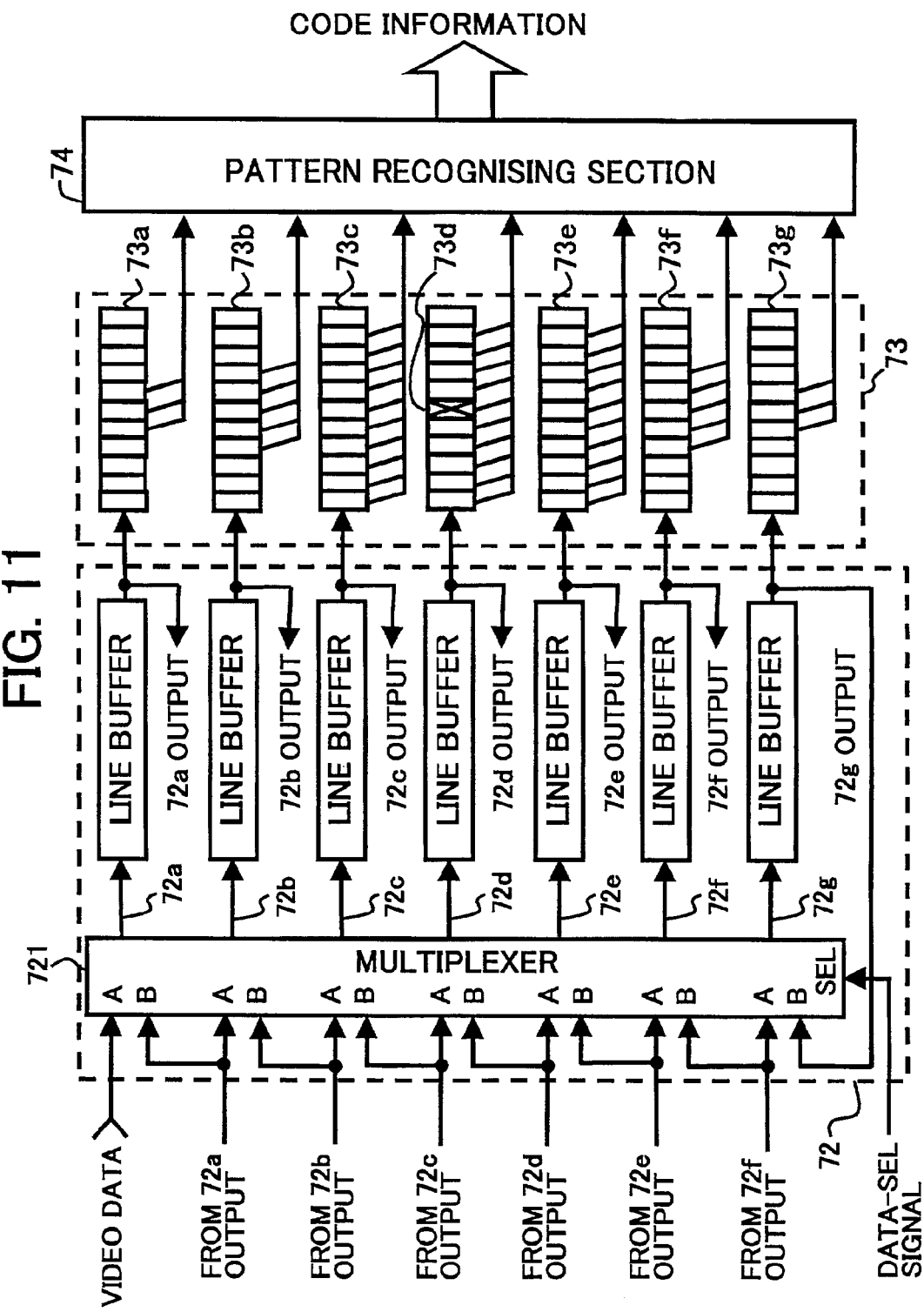
FIG. 11 is a block diagram illustrating an exemplary construction of main components of the dot correction section.

Turning now to FIGS. 10 and 11. In particular, FIG. 10 is a block diagram illustrating an exemplary construction of the dot correction section 7 shown in FIG. 7, and FIG. 11 is a diagram illustrating an exemplary construction of a main portion of the dot correction section 7 (i.e., a FIFO memory 72, and a window 73). As illustrated in FIG. 10, the dot correction section 7 includes a parallel/serial converter 71 (hereinafter referred to as a P/S converter), the FIFO memory 72 (First-In, First-Out memory), a window 73, a pattern recognizing section 74, a memory block 75, a video data output section 76, and a timing control section 77 which controls the above-described components such that the components synchronously operate with each other.

The P/S converter 71 is provided for converting video data, supplied by the controller 3 in FIG. 7, into one-bit serial data when the video data is 8-bit parallel data. In addition, the P/S converter 71 supplies the one-bit serial data to the FIFO memory 72. Thus, the P/S converter 71 is not involved with a dot correction operation. When video data supplied by the controller 3 is serial data, the P/S converter 71 is not required.

The FIFO memory 72 includes line buffers 72a through 72g connected in serial via a multiplexer 721 as shown in FIG. 11. The line buffers 72a through 72g store video data of an amount of a plurality of lines (e.g., 7-lines in this example) supplied by the controller 3.

When a data-sel (i.e., data selecting) signal supplied by a timing signal generating means provided in the timing control section 77 is "0", the multiplexer 721 selects and inputs serial video data supplied by the controller 3 via the P/S converter 71 as well as output data supplied by the line buffers 72a through 72f. When the data-sel signal is "1", the multiplexer 721 selects and inputs output data supplied by the line buffers 72a through 72g. The multiplexer 721 then stores the input data to the respective line buffers 72a through 72g.

Figure 12:
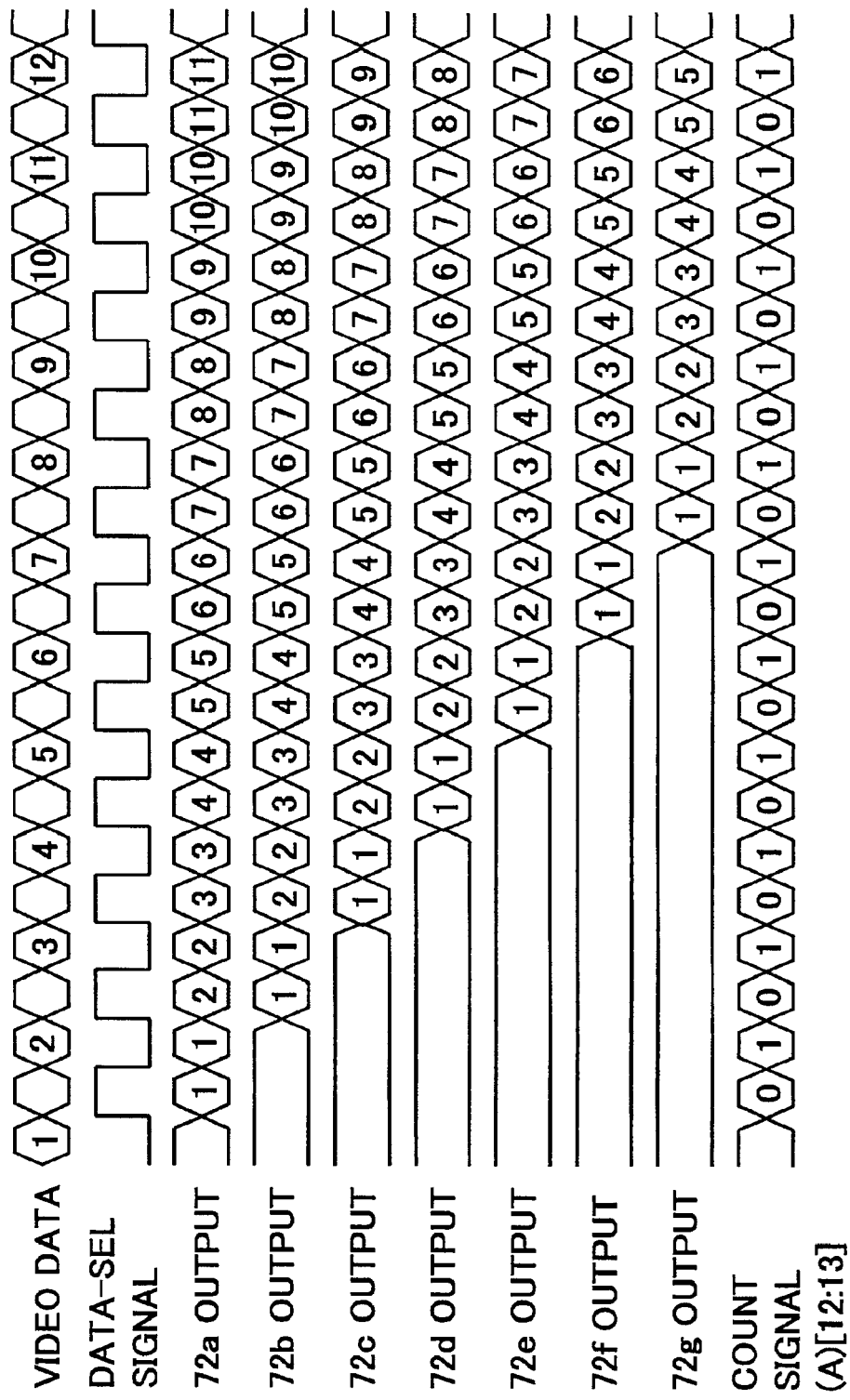
FIG. 12 is a timing diagram illustrating an example of operations of a FIFO memory.
Figure 13:
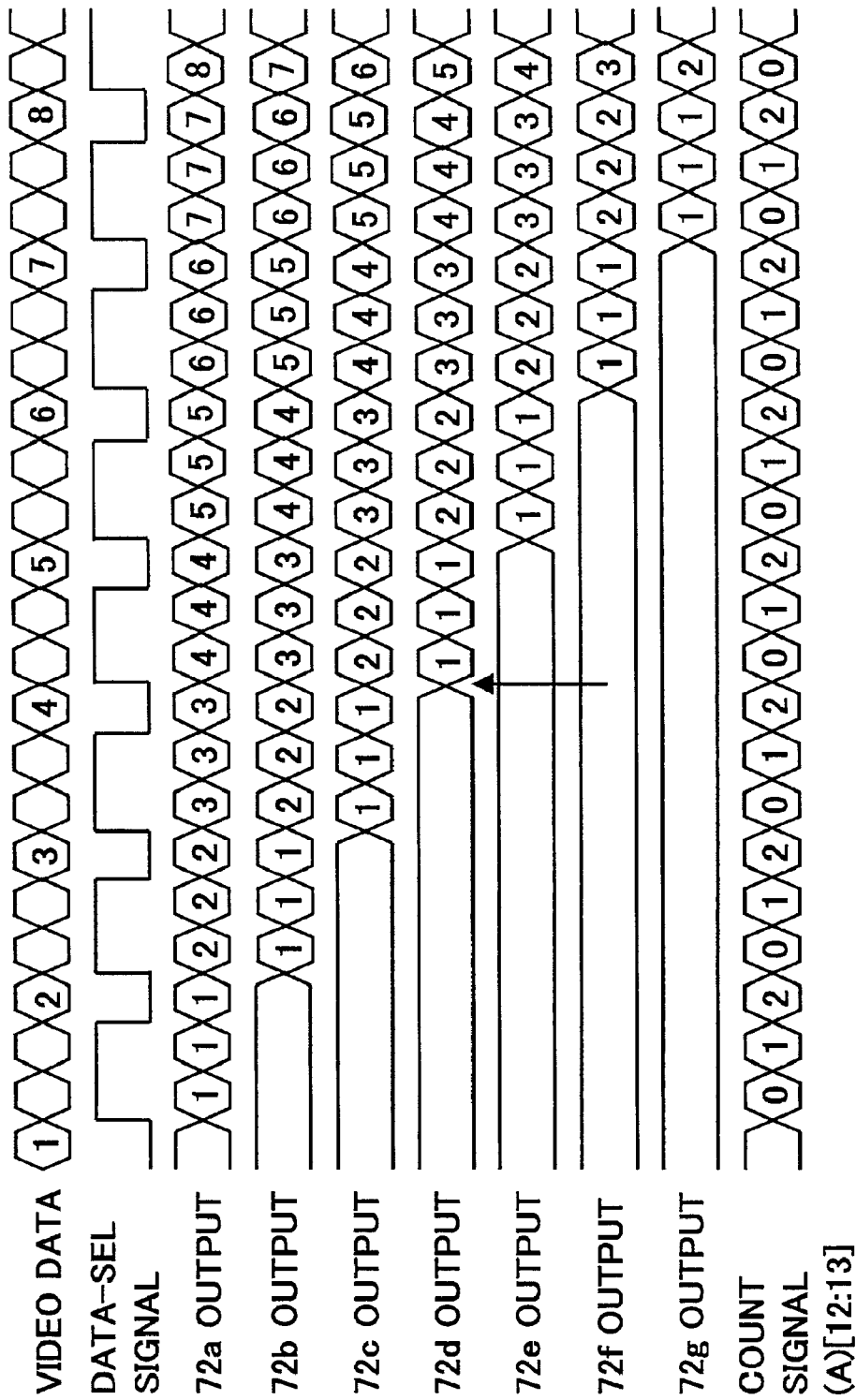
FIG. 13 is a timing diagram illustrating another example of operations of the FIFO memory.

Thus, the FIFO memory 72 operates as described in timing diagrams shown in FIGS. 12 and 13. That is, based on a data-sel signal, the line buffers 72a through 72g output data as shown in FIGS. 12 and 13 in response to input video data (i.e., each video data of 1, 2, 3, 4, . . . corresponds to a respective line of the video data in a main scanning direction). Simultaneously, a count signal (A13:12) shown in FIGS. 12 and 13 carrying code information is output. The code information indicates how many times the video data output from the line buffers 72a through 72g has been replicated. Video data is replicated twice and three times in FIG. 12 and FIG. 13, respectively.

The FIFO memory 72 is controlled such that a data-write signal alone is asserted so as to write data during a time period when a first data-sel signal is "0", and thereafter a data-write signal and a data-read signal are always repeatedly asserted and negated in alternate order so that the written data is surely read out. Thus, the FIFO memory 72 acts as an image data generating means.

As shown in FIG. 11, the window 73 includes 11-bit shift registers 73a through 73g for 7 lines of image data output by the line buffers 72a through 72g of the FIFO memory 72. Each of the 11-bit shift registers 73a through 73g is connected in series to the respective line buffers 72a through 72g. The shift registers 73a through 73g correspond to a window (sample window) which is used to detect a pattern. FIGS. 15A to 15D show an example of a shape of such a window.

A relevant dot (i.e., a dot currently being processed) is stored in a bit area positioned in the center of the middle shift register 73d, which is marked with "X" in FIG. 11.

Bits of input video data successively move through the line buffers 72a through 72g and through the shift registers 73a through 73g bit by bit. By this movement, a bit corresponding to the relevant dot sequentially changes to another bit. The bits of video data of the window 73, including the relevant dot in a center thereof, is successively obtained.

Based on dot information obtained from the window 73, the pattern recognizing section 74 recognizes information about a relevant dot and around the dot. Such information in particular includes characteristics of a line-shape of a boundary present between a black-dot region and a white-dot region of image data. The pattern recognizing section 74 converts the recognized characteristics into code information of a predetermined format so as to output it. The code information is used as an address code of the memory block 75.

Referring to FIGS. 15A to 15D, the window 73 includes a core area 73C located at the center of the window 73 and formed of 3 times 3-bit, an upper area 73U, a lower area 73D, a left area 73L, and a right area 73R. The detailed description of FIGS. 15A to 15D is omitted because the window 73 has the same function as that of described in Japanese Patent Laid-Open Publication No. 5-207282.

Figure 16:
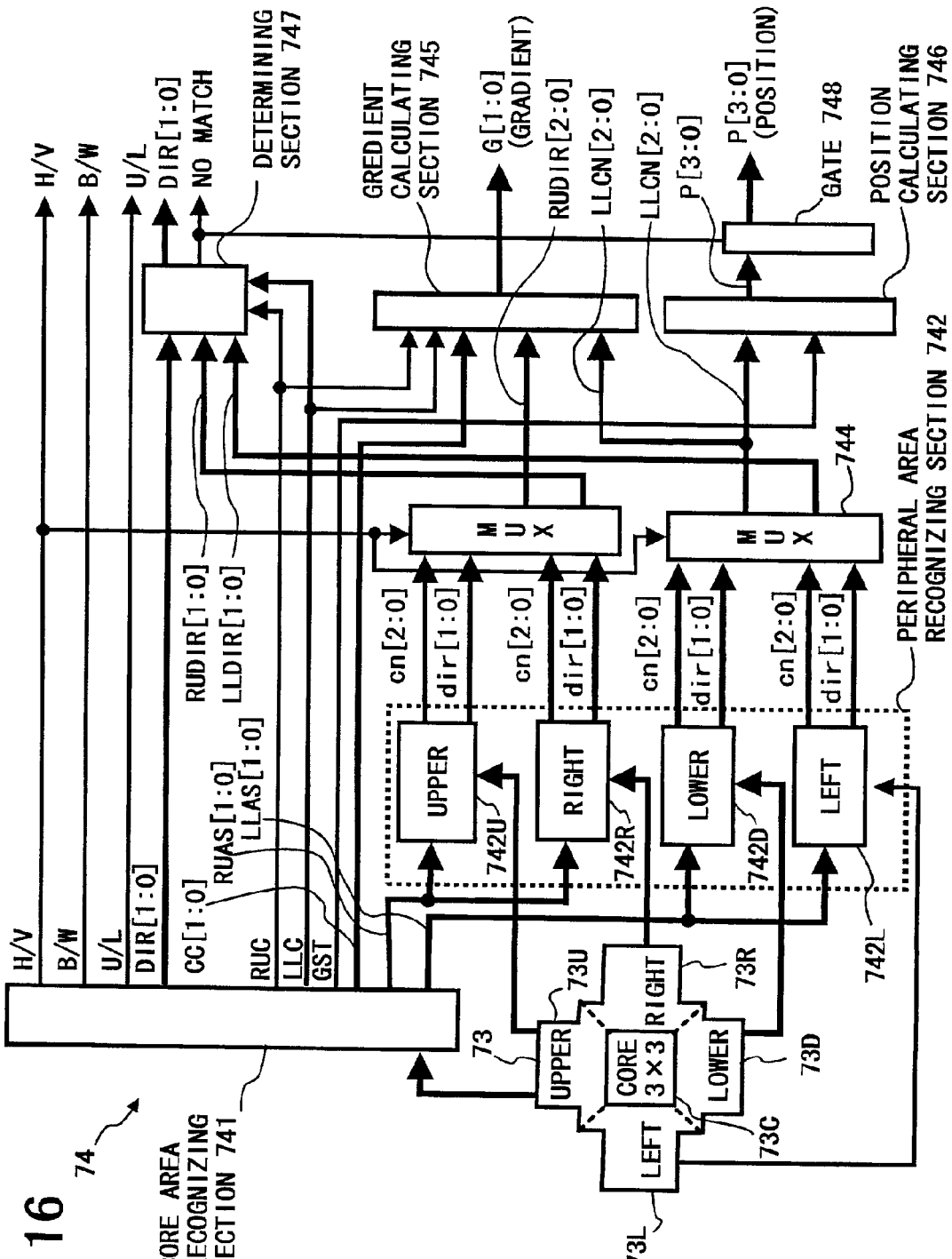
FIG. 16 is a block diagram illustrating an internal construction of a pattern recognizing section in connection with the window.

Referring now to FIG. 16, the pattern recognizing section 74 includes a core area recognizing section 741, a peripheral area recognizing section 742, multiplexers 743 and 744, a gradient calculating section 745, a position calculating section 746, a determining section 747 and a gate 748. The peripheral area recognizing section 742 includes an upper area recognizing section 742U, a right area recognizing section 742R, a lower area recognizing section 742D and a left area recognizing section 742L. The description of the function of each section is omitted because each section has the same function as the corresponding section described in the above-mentioned Japanese Patent Laid-Open Publication No. 5-207282.

Figure 17:
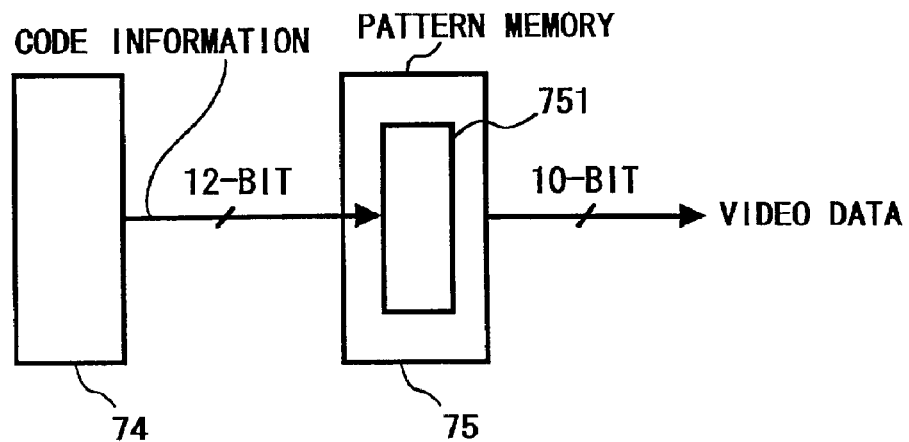
FIG. 17 is a diagram illustrating an exemplary construction of a memory block.
Figure 18:
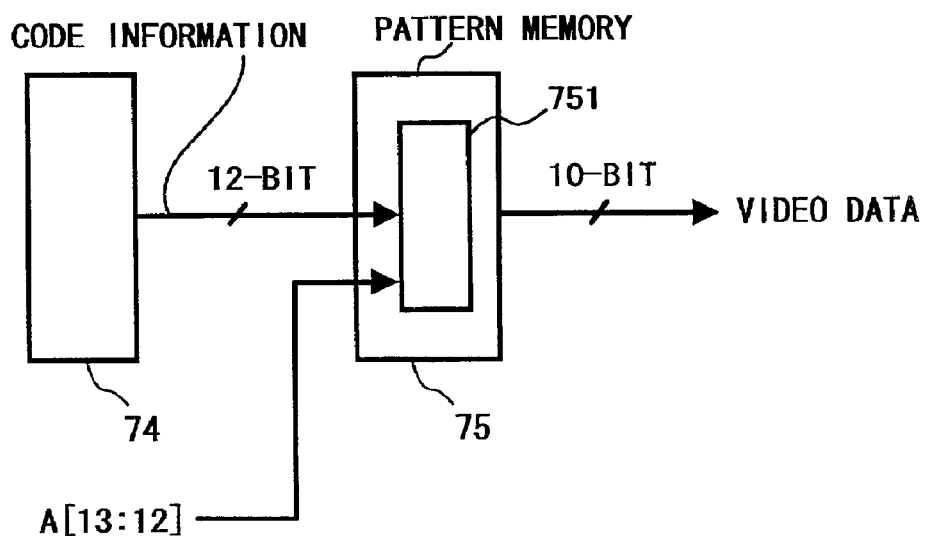
FIG. 18 is a diagram illustrating another exemplary construction of the memory block.

Referring now to FIGS. 17 and 18, the construction and the operation of the memory block 75 will be described. FIG. 17 is the same diagram described in the above-mentioned Japanese Patent Laid-Open Publication No. 5-207282. The memory block 75 only includes a pattern memory 751. Previously stored correction data of 10-bit is read out from the pattern memory 751 using code information of 12-bit output from the pattern recognizing section 74 as the corresponding address so as to output video data for driving a laser. Thus, the correction data becomes a corrected dot pattern.

In FIG. 18, the memory block 75 only includes the pattern memory 751. However, previously stored correction data is read out from the pattern memory 751 using code information of a sum total 14-bit as the corresponding address. The code information includes the information output from the pattern recognizing section 74 and replicated-order code information (2-bit:A13:12) indicating the order of replications of the image data, output from the above-mentioned image data generating means (i.e., FIFO memory 72), when the image data is repeatedly replicated based on a timing signal. Then, the video data is output for driving a laser, thus the correction data becomes a corrected dot pattern.

Different from the example described in FIG. 17, because the correction data is read out from the pattern memory 751 using the address (which includes the information indicating the replicated order of the image data when the image data, for which a correction is performed, is repeatedly replicated based on a timing signal), different and specific dot pattern of the correction data for each replicated-order of the image data can be output even when code information (which shows characteristics of the identical line shape) are supplied.

The memory block 75 outputs correction data as multivalued data, which is an integral multiple of a value obtained by dividing a width of each dot of video data supplied from the controller 3 into the multiple (e.g., a maximum value in the case of 10-division is 10 times). The output data regulates a time period of a laser emission.

The video data output section 76 converts the parallel information output from the memory block 75 into serial form, which is then supplied to the printer engine 5. The information is used to perform on/off control of the laser diode of the LD unit 50 in the writing unit 26.

It is assumed that the above-described on/off control of the laser diode in the LD unit 50 is performed by binary data. Therefore, when the control is performed by multivalued data, such parallel to serial conversion is not necessary. The parallel information from the memory block 75 is directly used as multivalued image data to control the on/off and the power of the laser diode of the LD unit 50 (i.e., in this case, the LD unit is designed to work by a multivalued data) so that the writing unit 26 writes a corresponding image.

Turning now to FIG. 1, which is a block diagram illustrating another exemplary construction of the dot correction section 7. In FIG. 1, a replication number setting device 78 (which sets the number of replications of the identical image data performed by the FIFO memory 72) is provided to the dot correction section 7 shown in FIG. 10.

The replication number setting device 78 is provided for setting any number of times the FIFO memory 72 repeatedly outputs replicated image data to the window 73 based on a timing signal by replicating identical image data stored in the FIFO memory 72 in a bit-map formation.

Figure 2:
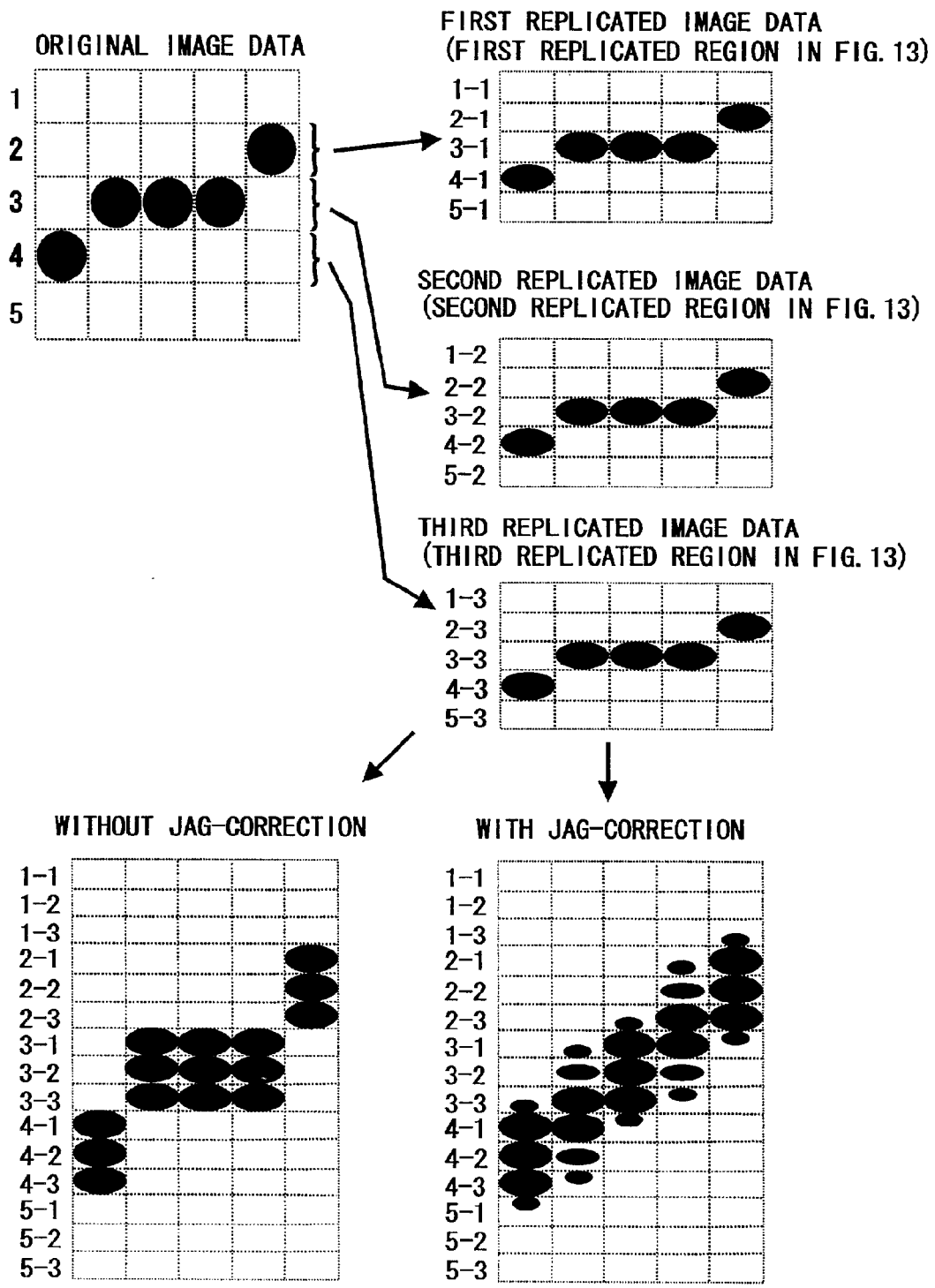
FIG. 2 illustrates an example of replicated image data.

FIG. 2 illustrates three replicated image data when the replication number setting device 78 is set to replicate the identical image data three times. FIG. 2 also shows the replicated image data when a dot correction on each replicated different image data is performed.

In this example, the original image data is replicated three times based on a line synchronizing signal (i.e., LSYNC signal). The LSYNC signal indicates a time to start writing each line of the original image data in a main scanning direction on the photoconductive drum 15 by the LD unit 50. The FIFO memory 72 outputs the image data to the pattern recognizing section 74 in a ⅓ period of the original image data being scanned along a sub-scanning direction.

Code information indicating recognized characteristics of a line shape, which is output from the pattern recognizing section 74, is identical code information corresponding to each dot position. A different address for each replicated image data is supplied to the memory block 75 by adding the replicated-order code information (A13:12), which shows the number of replications of the image data stored in the bit-map formation. The memory block 75 can also output respectively different image data as shown in FIG. 2. The above discussion is an example of a jag-compensation including a resolution increasing process performed on an original image.

Figure 3:
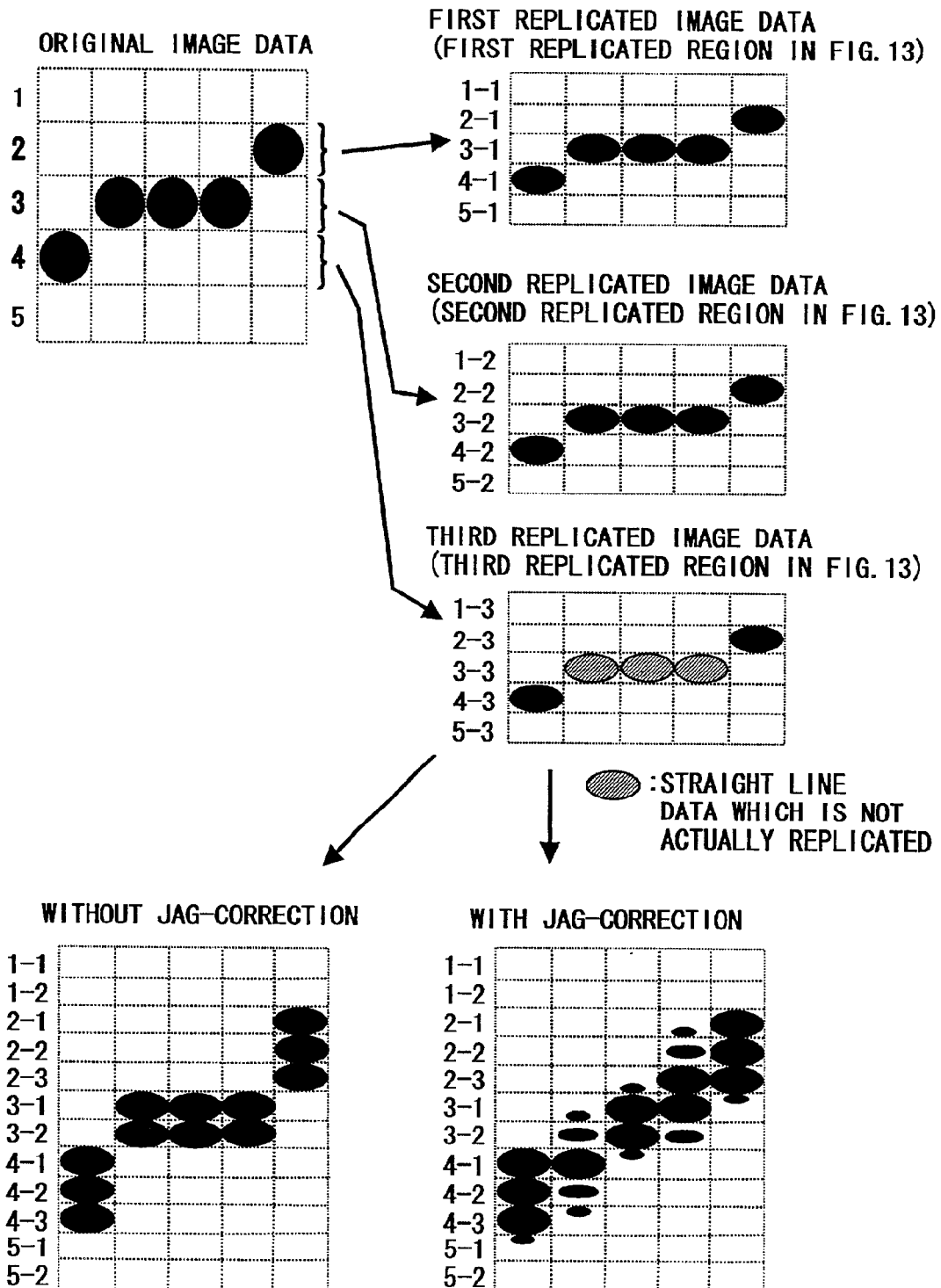
FIG. 3 illustrates another example of replicated image data.

FIG. 3 illustrates replicated image data when the replication number setting device 78 is set such that the replication of the identical image data is performed two and three times. FIG. 3 also shows the replicated image data when a dot correction is performed on each replicated different image data.

Figure 14:
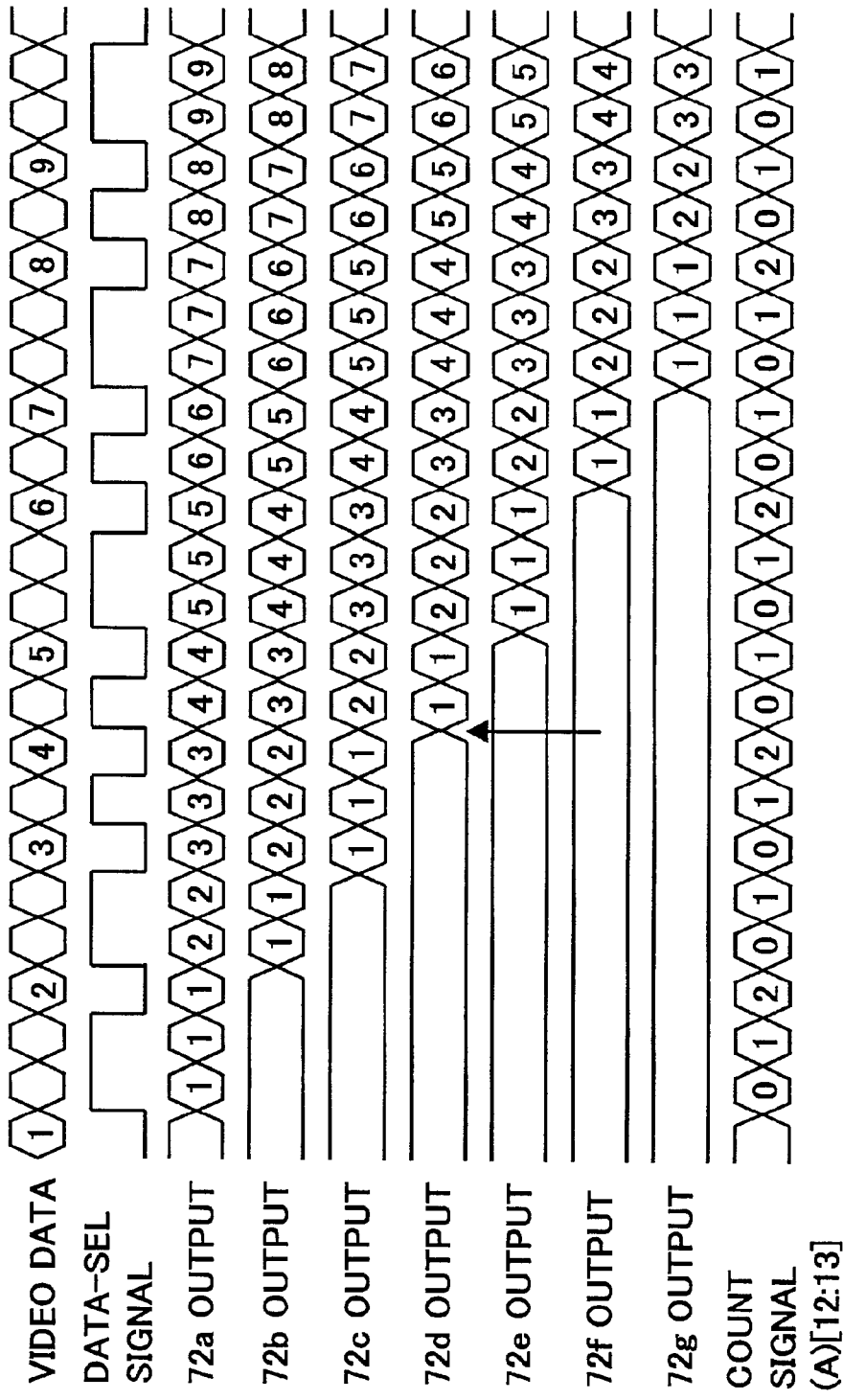
FIG. 14 is a timing diagram illustrating still another example of operations of the FIFO memory.
Figure 15A:
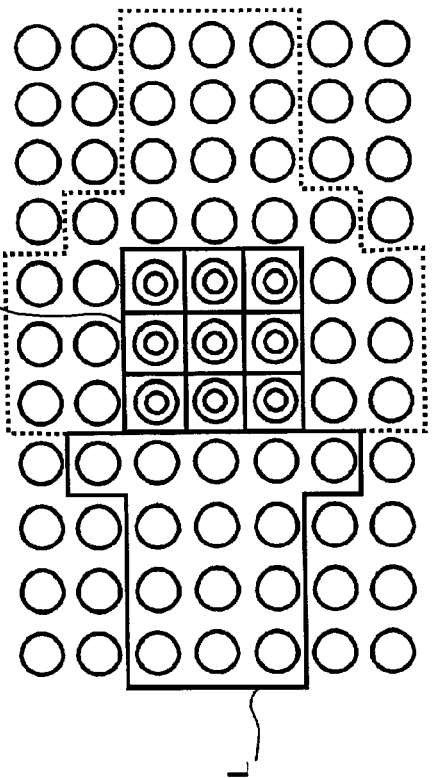
FIGS. 15A to 15D are diagrams illustrating an example of a window for detecting a pattern.
Figure 15B:
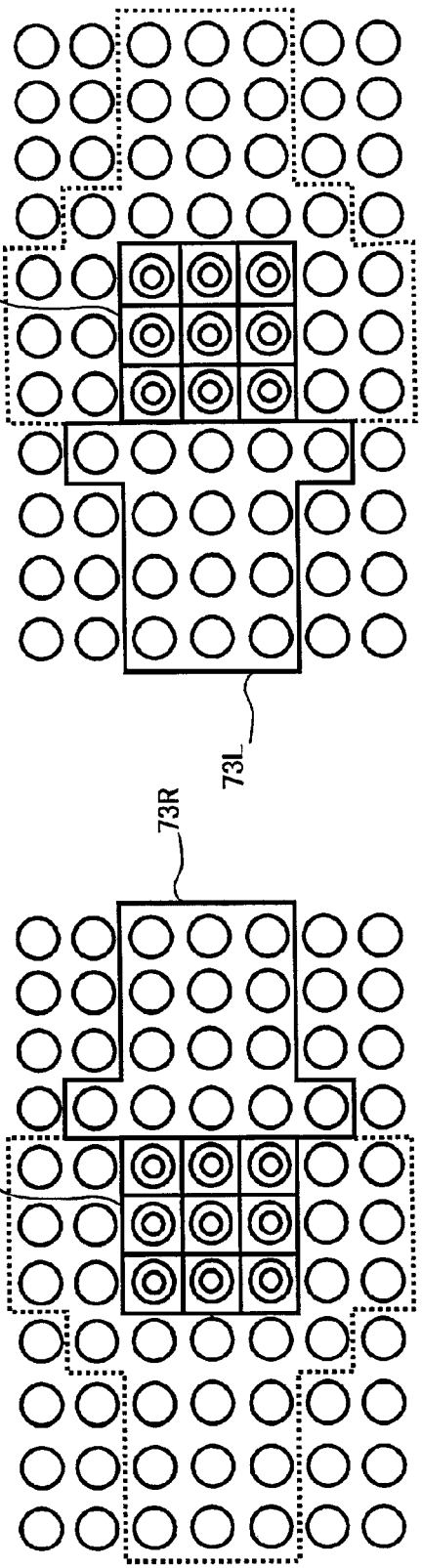
Figure 15C:
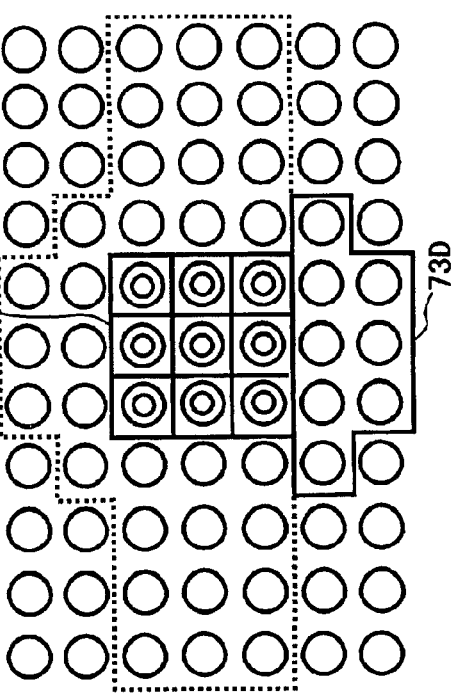
Figure 15D:
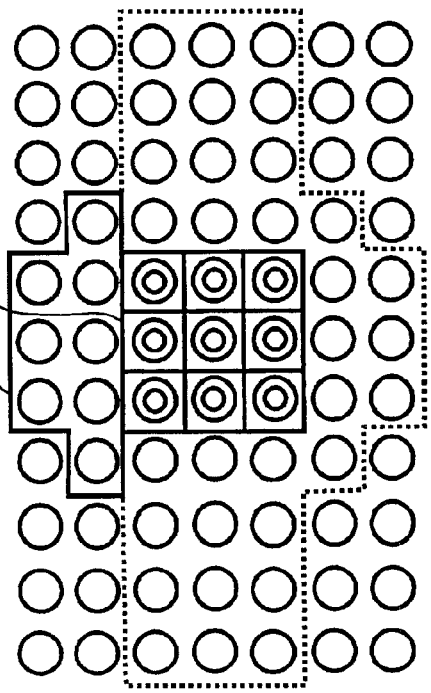

In this example, the original image data is replicated alternately three times and two times based on the LSYNC signal. The LSYNC signal indicates a time to start writing each line of the original image data in a main scanning direction on the photoconductive drum 15 by the LD unit 50. The FIFO memory 72 controls the image data as illustrated in FIG. 14, and outputs the image data to the pattern recognizing section 74 by alternately replicating the image data three times and two times in a ⅓ period of the original image data being scanned along a sub-scanning direction.

As is the case with FIG. 2, code information indicating recognized characteristics of a line shape, which is output from the pattern recognizing section 74, is identical code information corresponding to each dot position. A different address for each replicated iamge data is supplied to the memory block 75 by adding the replicated-order code information (A 13:12), which shows the order of replications of the image data stored in a bit-map formation. Thus, the memory block 75 can output respectively different image data as shown in FIG. 3.

According to an example described in FIG. 3, a reduction in size of an image in a sub-scanning direction is performed without completely erasing the original image when a jag-correction on the original image, as described referring to FIG. 2, is performed. Further, the reduction rate of image can be made variable by the combination of values set at the replication number setting device 78.

Figure 4:
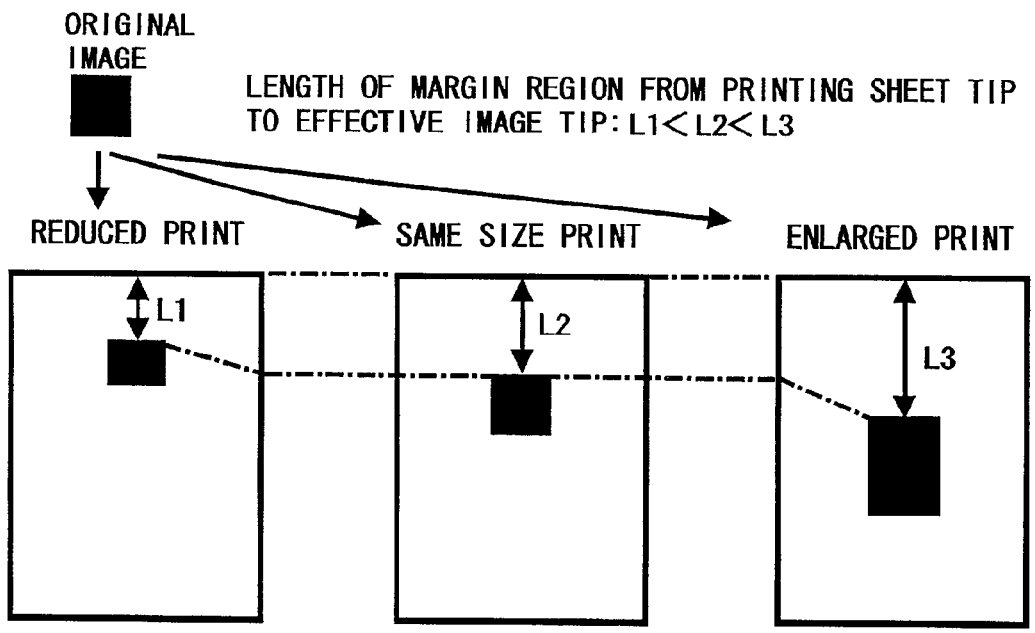
FIG. 4 is a schematic drawing illustrating positions of resultant images in a printing sheet when an original image is printed in a different printing mode.

FIG. 4 is a schematic drawing illustrating positions of image data shown in FIG. 3 in a printing sheet, when the image data is printed in various sizes. In this example, the FIFO memory 72 performs the operation shown in FIG. 14 on the image data regardless of whether the image data sets a margin region in a printing sheet or that is printed in an effective region in the printing sheet. Therefore, a print start position of the image data to be printed in the effective image region in the printing sheet differs according to a printing mode (i.e., reduced, enlarged, or same size print).

An output start position of the first line of the line buffer 72d is indicated by an arrow in FIG. 13 when a same size print is performed. An arrow in FIG. 14 indicates the output start position of the first line of the line buffer 72d when a reduced size print is performed, in which the output start position differs from that of in FIG. 13 in response to an input position of the first line of the video data.

Figure 5:
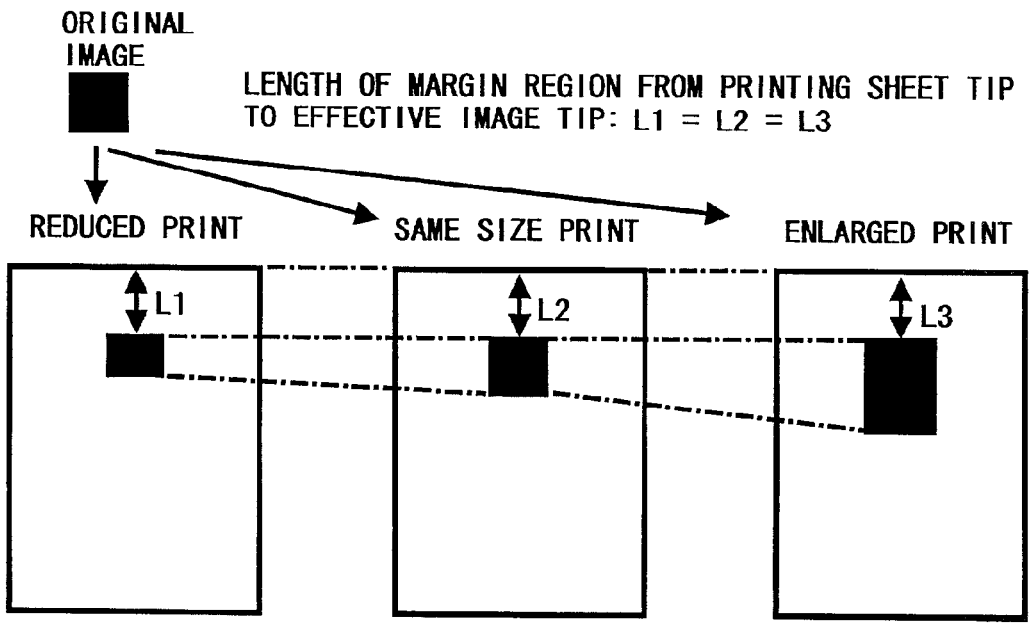
FIG. 5 is another schematic drawing illustrating positions of resultant images in a printing sheet when an original image is printed in a different printing mode.

FIG. 5 is a schematic drawing also illustrating positions of image data shown in FIG. 3 in a printing sheet when the image data is printed in various sizes. In contrast to the example described in FIG. 4, information (which shows a processing time period of image data to be printed in an effective image region in a printing sheet in both a main scanning and a sub-scanning directions) is provided to an effective image-region setting device 79 in FIG. 1. Then, the FIFO memory 72 performs the operation shown in FIG. 14 only when the image data to be printed in the effective image region in the printing sheet is processed by the control of the timing control section 77. Therefore, the same print start position of the image data to be printed in the effective image region in the printing sheet is maintained irrespective of the printing modes, because the processing corresponding to the printing modes is not performed on the image data that sets the margin region in the printing sheet. Thus, the image data (on which an image manipulating process is performed only on image data printed in the effective image region in the printing sheet) is printed.

Figure 6:
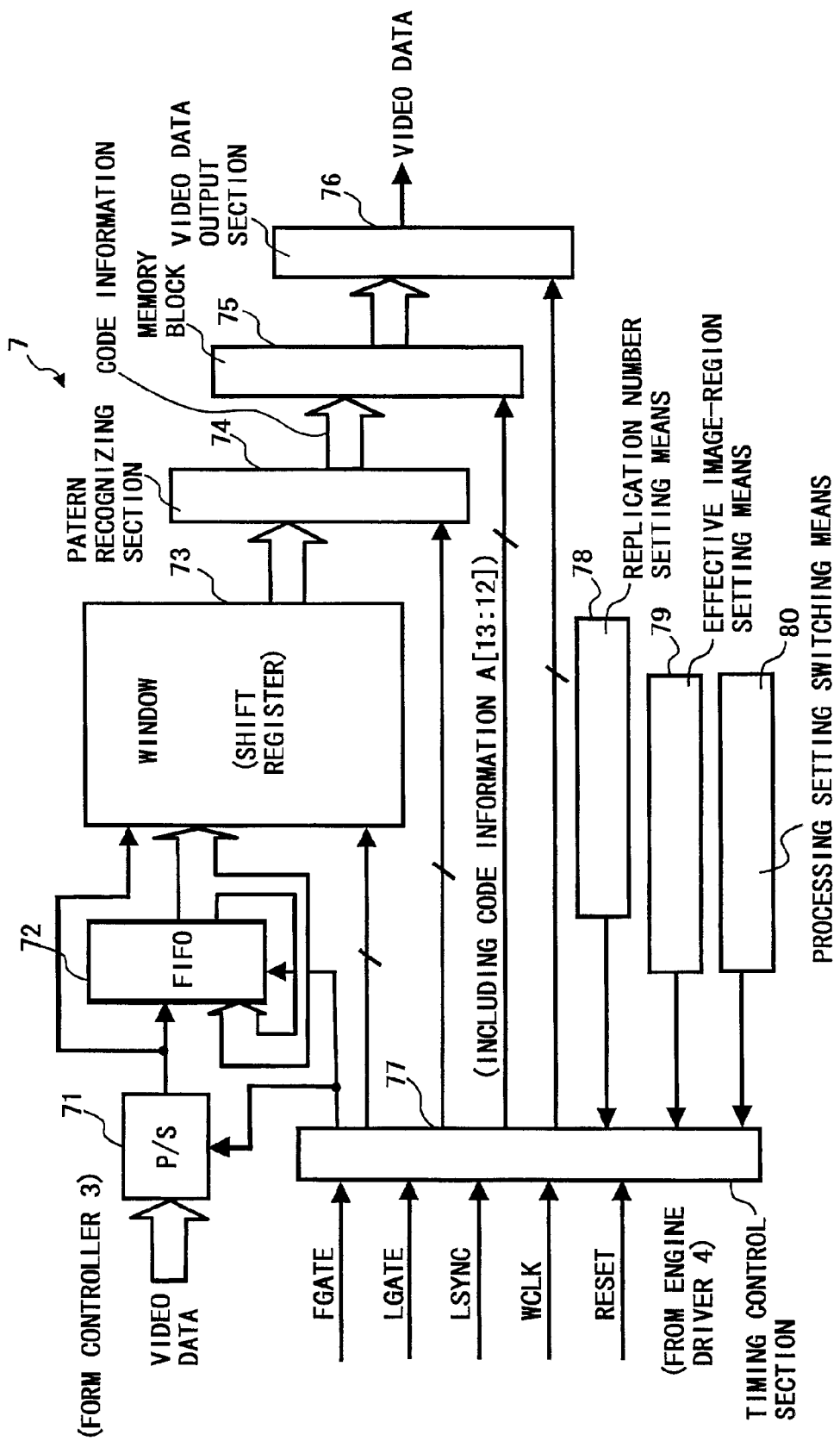
FIG. 6 is a block diagram illustrating another exemplary construction of a dot correction section of a laser printer as an image forming apparatus according to the present invention.

FIG. 6 shows another example according to the present invention, in which a processing setting switching device 80 is provided to the example described with reference to FIG. 5. The processing setting switching device 80 selects whether or not a replication of original image data stored in a bit-map formation is performed only when image data to be printed in an effective image region in a printing sheet is processed.

As is the case with the processing of image data for a same size print described in FIG. 4, when the same number of replication is always performed on image data which sets a margin region in a printing sheet and that printed in an effective image region in the printing sheet for a jag-correction (i.e., when the FIFO memory 72 exercises the control shown in FIG. 13), calculations of a processing start position for the image data (which is printed in the effective image region) in a main scanning and a sub-scanning directions is comparatively easily performed.

According to the example described with reference to FIG. 5, the number of replications of an identical image data stored in a bit-map formation printed in an effective image region in a printing sheet differs from that of the identical image data which sets a margin region thereof. The number of replications of the identical image data which sets the margin region in the printing sheet is fixed to once, while that of the identical image data printed in the effective image region in the printing sheet is fixed to an arbitrary number. Thus, a different calculation is performed in the processing of the image data which sets the margin region and the image data to be printed in the effective image region so as to determine a respective position in the printing sheet. Practically, it is likely that a complicated calculation with a parameter including inside delay quantity caused by a processing circuit of an image data processing apparatus is required.

When the replication of the identical image data stored in a bit-map formation can always be performed in the same number of times for the image data which set a margin region in a printing sheet and that to be printed in an effective image region thereof (i.e., in processing an image data for a same size print with a jag-correction), the processing setting switching device 80 is set such that the replication of the identical image data stored in a bit-map formation is performed without being limited to the time period during which the processing of the image data to be printed in the effective image region is performed. Hence, the same calculation can be performed in the processing of the image data which sets the margin region in the printing sheet and that to be printed in the effective image region thereof so as to determine respective position in the printing sheet, which makes the calculation simple.

Further, the timing control section 77 receives a frame gate signal (FGATE signal), a line gate signal (LGATE signal), the LSYNC signal, the image clock signal WCLK and a RESET signal from the engine driver 4, and generates clock signals and so forth to the above-mentioned blocks 71 through 76 to maintain synchronized operations thereamong. The FGATE signal defines a one-page writing time period, the LGATE signal defines a one-line writing time period, the LSYNC signal indicates a time to start and end the writing for each line, and the signal WCLK defines a one-dot reading and writing time period.

In addition, correction data output from the memory block 75 can selectively be loaded from the ROM 32 or the ROM 42 by the MPU 31 of the controller 3 or by the MPU 41 of the engine driver 4. The correction data can also be downloaded from the host computer 1. With this arrangement, correction data for image data which requires correction can easily be changed.

According to the above-described examples, the dot correction section 7 acting as the image processing apparatus according to the present invention is arranged in the internal interface 6 which is in communication with the controller 3 of the laser printer 2 and the engine driver 4. However, the dot correction section 7 may be arranged either in the side of the controller 3 or in the side of the engine driver 4.

Further, the present invention may be applied not only to a laser printer but also to various image forming apparatuses and to image display apparatuses which display formed images. The image forming apparatuses may include an LED printer, an optical printer, a digital copying machine, a facsimile, and so forth in which an image is formed by bit-mapping image data.

Obviously, numerous additional modifications and variations of the present invention are possible in light of the above teachings. It is therefore to be understood that within the scope of the appended claims, the present invention may be practiced otherwise than as specifically described herein.

What is claimed is:

1. An image data processing apparatus, comprising:
   an image data replicating device configured to repeatedly replicate identical bit-mapped image data in predetermined times timed to a periodically generated signal;
   a pattern recognizing device configured to recognize characteristics of a line shape of a boundary between a black-dot region and a white-dot region of the image data in a bit-map formation replicated by said replicating device, the pattern recognizing device converting the recognized characteristics of the line shape of a dot into code information;
   a determining device configured to determine whether or not the dot is to be corrected by using at least a part of the code information; and
   a dot correction device configured to perform the correction, based on the code information, on a dot determined to be corrected by the determining device,
   wherein the number of times said image data replicating device replicates the identical bit-mapped image data is switchably set to one of 1) a case where the number of the replications is set to one fixed value, and 2) a case where the number of the replications is set such that two or more values are periodically selected.

2. The image data processing apparatus according to claim 1, wherein said image data replicating device is set to perform the replication of the identical bit-mapped image data only when image data to be printed in an effective image region in a printing sheet is processed.

3. The image data processing apparatus according to claim 1, further comprising:
   a processing setting switching device configured to switchably select whether or not the replication of the identical bit-mapped image data is performed only when image data to be printed in an effective image region in a printing sheet is processed.

4. An image data processing apparatus, comprising:
   an image data replicating means for repeatedly replicating identical bit-mapped image data in predetermined times timed to a periodically generated signal;
   a pattern recognizing means for recognizing characteristics of a line shape of a boundary between a black-dot region and a white-dot region of the image data in a bit-map formation replicated by said replicating means, the pattern recognizing means converting the recognized characteristics of the line shape of a dot into code information;
   a determining means for determining whether or not the dot is to be corrected by using at least a part of the code information; and
   a dot correction means for performing the correction, based on the code information, on a dot determined to be corrected by the determining means,
   wherein the number of times said image data replicating means replicates the identical bit-mapped image data is switchably set to one of 1) a case where the number of the replications is set to one fixed value, and 2) a case where the number of the replications is set such that two or more values are periodically selected.

5. The image processing apparatus according to claim 4, wherein said image data replicating means is set to perform the replication of the identical bit-mapped image data only when image data to be printed in an effective image region in a printing sheet is processed.

6. The image data processing apparatus according to claim 4, further comprising:
   a processing setting switching means for switchably selecting whether or not the replication of the identical bit-mapped image data is performed only when image data to be printed in an effective image region in a printing sheet is processed.

7. An image data processing method, comprising the steps of:
   replicating identical bit-mapped image data in predetermined times timed to a periodically generated signal;
   recognizing characteristics of a line shape of a boundary between a black-dot region and a white-dot region of the image data in a bit-map formation replicated in said replicating step;
   converting the recognized characteristics of the line shape of a dot into code information;
   determining whether or not the dot is to be corrected by using at least a part of the code information;
   performing the correction, based on the code information, on a dot determined to be corrected in the determining step; and
   setting the number of times said image data replicating device replicates the identical bit-mapped image data to one of 1) a case where the number of the replication is set to one fixed value, and 2) a case where the number of the replication is set such that two or more values are periodically selected.

8. The image data processing method according to claim 7, further comprising:
   performing the replication of the identical bit-mapped image data only when image data to be printed in an effective image region in a printing sheet is processed.

9. The image data processing method according to claim 7, further comprising:

selecting whether or not the replication of the identical bit-mapped image data is performed only when image data to be printed in an effective image region in a printing sheet is processed.

* * * * *